(12) United States Patent
Shah et al.

(10) Patent No.: US 8,996,172 B2
(45) Date of Patent: Mar. 31, 2015

(54) DISTANCE SENSOR SYSTEM AND METHOD

(75) Inventors: Pankaj Shah, San Jose, CA (US); Kurt Konolige, Menlo Park, CA (US); Joe Augenbraun, Foster City, CA (US); Nick Donaldson, San Francisco, CA (US); Charles Fiebig, Palo Alto, CA (US); Yuming Liu, San Jose, CA (US); Hassaan Moin Khan, San Francisco, CA (US); Joseph Pinzarrone, Montara, CA (US); Leo Salinas, Mountain View, CA (US); Hua Tang, Foster City, CA (US); Rafael Taylor, Alameda, CA (US)

(73) Assignee: Neato Robotics, Inc., Newark, CA (US)

( * ) Notice: Subject to any disclaimer, the term of this patent is extended or adjusted under 35 U.S.C. 154(b) by 1603 days.

(21) Appl. No.: 11/780,017

(22) Filed: Jul. 19, 2007

(65) Prior Publication Data

US 2010/0030380 A1 Feb. 4, 2010

Related U.S. Application Data

(63) Continuation-in-part of application No. 11/515,022, filed on Sep. 1, 2006, now Pat. No. 7,555,363, and a continuation-in-part of application No. 11/515,100, filed on Sep. 1, 2006.

(51) Int. Cl.
| | |
|---|---|
| *G05B 15/02* | (2006.01) |
| *G06G 7/78* | (2006.01) |
| *G01C 3/00* | (2006.01) |
| *G01S 7/481* | (2006.01) |
| *G01S 17/42* | (2006.01) |
| *G01S 17/48* | (2006.01) |

(Continued)

(52) U.S. Cl.
CPC .............. *G01S 7/4813* (2013.01); *G01S 17/42* (2013.01); *G01S 17/48* (2013.01); *G01S 7/4817* (2013.01); *G01S 2007/4977* (2013.01); *G01S 7/497* (2013.01)
USPC ............. 700/258; 700/255; 356/3.1; 356/4.1; 701/300

(58) Field of Classification Search
USPC .......... 356/3.1, 4.1, 4.01, 4.02, 623; 700/245, 700/258, 255; 701/23, 300–302; 73/1.79
See application file for complete search history.

(56) References Cited

U.S. PATENT DOCUMENTS 3,809,480 A * 5/1974 Somerville et al. ........... 356/338
4,948,246 A 8/1990 Shigematsu
(Continued)

FOREIGN PATENT DOCUMENTS

| DE | 19757847 A1 | 7/1999 |
| DE | 2006017076 U1 | 1/2007 |

(Continued)

OTHER PUBLICATIONS

By: Jack Buffington, Title of Article: Rubber Bands "Laser Range Finding" and Bailing Wire, Servo Magazine Sep. 2006, pp. 19-23.
(Continued)

*Primary Examiner* — Thomas G Black
*Assistant Examiner* — Peter D Nolan
(74) *Attorney, Agent, or Firm* — Kenyon & Kenyon LLP

(57) ABSTRACT

A distance measuring system and method employing a laser distance sensor may have utility in various applications. In accordance with one aspect of the present invention, a laser distance sensor may acquire accurate distance measurements with a short baseline.

25 Claims, 8 Drawing Sheets

(51) Int. Cl.
G05B 19/042 (2006.01)
G01S 7/497 (2006.01)

(56) References Cited

U.S. PATENT DOCUMENTS

| | | | |
|---|---|---|---|
| 5,006,721 A * | 4/1991 | Cameron et al. | 250/559.16 |
| 5,040,116 A | 8/1991 | Evans, Jr. et al. | |
| 5,202,661 A | 4/1993 | Everett et al. | |
| 5,279,672 A | 1/1994 | Betker et al. | |
| 5,313,063 A | 5/1994 | Netzer | |
| 5,363,305 A | 11/1994 | Cox et al. | |
| 5,760,390 A | 6/1998 | Vezzalini et al. | |
| 5,793,934 A | 8/1998 | Bauer | |
| 5,905,567 A * | 5/1999 | Dewan | 356/3.06 |
| 5,957,984 A | 9/1999 | Rencken | |
| 6,123,264 A * | 9/2000 | Li et al. | 235/472.01 |
| 6,321,140 B1 | 11/2001 | Fujita et al. | |
| 6,480,270 B1 * | 11/2002 | Studnicka et al. | 356/141.1 |
| 6,481,515 B1 | 11/2002 | Kirkpatrick et al. | |
| 6,535,282 B2 * | 3/2003 | Hedges et al. | 356/141.3 |
| 6,542,789 B2 | 4/2003 | Ufheil | |
| 6,591,165 B2 | 7/2003 | Takamura | |
| 6,611,738 B2 | 8/2003 | Ruffner | |
| 6,728,598 B2 | 4/2004 | Fujita et al. | |
| 6,728,608 B2 * | 4/2004 | Ollis et al. | 701/28 |
| 6,741,054 B2 | 5/2004 | Koselka et al. | |
| 6,889,118 B2 | 5/2005 | Murray, IV et al. | |
| 6,953,299 B2 | 10/2005 | Wang et al. | |
| 6,989,890 B2 * | 1/2006 | Riegl et al. | 356/5.01 |
| 7,054,715 B2 | 5/2006 | Takano | |
| 7,120,517 B2 | 10/2006 | Friedman | |
| 7,202,941 B2 * | 4/2007 | Munro | 356/5.01 |
| 2003/0097202 A1 | 5/2003 | Fujita et al. | |
| 2003/0191560 A1 | 10/2003 | Yokoo et al. | |
| 2003/0195658 A1 | 10/2003 | Takano | |
| 2004/0065810 A1 | 4/2004 | Casteleiro | |
| 2004/0076324 A1 | 4/2004 | Burl et al. | |
| 2004/0167669 A1 | 8/2004 | Karlsson et al. | |
| 2004/0167670 A1 | 8/2004 | Goncalves et al. | |
| 2004/0168148 A1 | 8/2004 | Goncalves et al. | |
| 2005/0155630 A1 | 7/2005 | Kilkenny et al. | |
| 2005/0171637 A1 | 8/2005 | Tani et al. | |
| 2005/0209736 A1 | 9/2005 | Kawagoe | |
| 2005/0216126 A1 | 9/2005 | Koselka et al. | |
| 2005/0246065 A1 | 11/2005 | Ricard | |
| 2006/0027404 A1 | 2/2006 | Foxlin | |
| 2006/0041331 A1 | 2/2006 | Myeong et al. | |
| 2006/0060216 A1 | 3/2006 | Woo | |
| 2006/0232787 A1 * | 10/2006 | Hoffmann et al. | 356/602 |
| 2006/0235585 A1 | 10/2006 | Tanaka | |
| 2006/0288519 A1 | 12/2006 | Jaworski | |
| 2007/0061043 A1 | 3/2007 | Ermakov et al. | |
| 2007/0076089 A1 * | 4/2007 | DePue et al. | 348/42 |
| 2008/0027591 A1 | 1/2008 | Lenser et al. | |
| 2008/0105067 A1 | 5/2008 | Frey | |
| 2008/0109126 A1 | 5/2008 | Sandin et al. | |
| 2009/0138233 A1 * | 5/2009 | Kludas et al. | 702/158 |
| 2010/0020306 A1 * | 1/2010 | Hall | 356/5.01 |
| 2010/0049391 A1 | 2/2010 | Nakano | |
| 2011/0170113 A1 * | 7/2011 | Bridges et al. | 356/482 |

FOREIGN PATENT DOCUMENTS

| | | |
|---|---|---|
| JP | 59116806 A | 7/1984 |
| JP | 62257077 A | 11/1987 |
| JP | 63055409 A | 3/1988 |
| JP | 1106204 A | 4/1989 |
| JP | 3137507 A | 6/1991 |
| JP | 3181812 A | 8/1991 |
| JP | 05087922 A | 4/1993 |
| JP | 6214149 A | 8/1994 |
| JP | 7190848 A | 7/1995 |
| JP | 10166971 A | 6/1998 |
| WO | 2003040845 A1 | 5/2003 |
| WO | 2007/028049 A2 | 3/2007 |
| WO | 2009012474 A1 | 1/2009 |

OTHER PUBLICATIONS

By: F. Blais, Title of Article: NRC CNRC Review of 20 Years of Range Sensor Development, Journal of Electronic Imaging, Jan. 2004, 13(1):231-240.

By: K. H. Strobl, W. Sepp, E. Wahl, T. Bodenmuller, M. Suppa, J. F. Seara, and G. Hirzinger, Title of Article: The DLR Multisensory Hand-Guided Device: The Laser Stripe Profiler, Institute of Robotics and Mechatronics German Aerospace Center DLR, IEEE 2004.

By: C. Mertz, J. Kozar, J.R. Miller, and C. Thorge, Title of Article: Eye-safe Laser Line Striper for Outside Use, Robotics Institute, Carnegie Mellon University.

J. Folkeson, P. Jensfelt and H. Christensen, "Vision SLAM in the Measurement Subspace," In Proc. 2005 IEEE International Conference on Robotics and Automation, Apr. 2005, pp. 30-35.

C. Stachniss, D. Hahnel and W. Burgard, "Exploration with Active Loop-Closing for FastSLAM," In Proc. 2004 IEEE/RSJ International Conference on Intelligent Robotics, 2004, pp. 1505-1510.

J. Folkesson and H. Christensen, "Outdoor Exploration and SLAM using a Compressed Filter," In Proc. IEEE Intl. Conf on Robotics and Automation, 2003, pp. 419-426.

A. Makarenko, S. Williams, F. Bourgault, H. Durrant-Whyte, "An Experiment in Integrated Exploration," In Proc. 2002 IEEE-RSJ Intl. Conference on Intelligent Robots and Systems, 2002, pp. 534-539.

A. J. Davison, N. Kita, "Sequential localisation and map-building for real-time computer vision and robotics," Robotics and Autonomous Systems, 2001, pp. 171-183.

K. Hsiao, H. Plinval-Salgues, J. Miller, "Particle Filters and Their Applications," Cognitive Robotics, Apr. 11, 2005, 99 pp.

S. Thrun, M. Montemerlo, D. Koller, B. Wegbreit, J. Nieto, E. Nebot, "FastSLAM: An efficient solution to the simultaneous localization and mapping problem with unknown data association," Journal of Machine Learning Research, 2004, 48 pp.

K. Kouzoubov, "Hybrid Topological/Metric Approach to SLAM," In Proc. IEEE International Conference on Robotics and Automation '04, 2004, pp. 872-877.

Fu, Sheng, et al., "Slam for mobile robots using laser range finder and monocular vision, " IEEE, Mechatronics and Machine Vision in Practice Conference, Dec. 2007, pp. 91-96.

* cited by examiner

DISTANCE SENSOR SYSTEM AND METHOD

CROSS-REFERENCE TO RELATED APPLICATIONS

The present application is a continuation in part of co-pending U.S. patent application Ser. No. 11/515,022, entitled "MULTI-FUNCTION ROBOTIC DEVICE," filed Sep. 1, 2006, and a continuation in part of co-pending U.S. patent application Ser. No. 11/515,100, entitled "LOCALIZATION AND MAPPING SYSTEM AND METHOD FOR A ROBOTIC DEVICE," filed Sep. 1, 2006, the disclosures of which are incorporated herein by reference in their entireties.

BACKGROUND

1. Field of the Invention

Aspects of the present invention relate generally to the field of distance measuring, and more particularly to a distance measuring system and method employing a laser distance sensor having utility in various applications.

2. Description of Related Art

Automatic or autonomous devices (i.e., robotic devices or robots) that can be used for home and commercial applications, such as cleaning, often must be operative to navigate around an environment with no, or minimal, input from a user or an operator. To be cost-effective for many home or commercial applications, conventional sensor systems enabling or facilitating robot navigation tend to be very simple. In that regard, primitive navigation systems cause conventional devices to ricochet around an operating environment inefficiently; these devices reactively carom off of obstacles and repeatedly re-visit areas that have already been treated, wasting valuable consumables and battery capacity. As an alternative, it may be desirable in some instances to implement a sophisticated sensor system in a way that serves a number of functions while minimizing or eliminating redundancies to maintain cost-effectiveness.

The foregoing co-pending United States patent applications provide, among other things, practical solutions to previously unresolved difficulties typically associated with navigation of robotic devices; the disclosed embodiments of distance sensor apparatus and methods have utility in numerous applications beyond robotic device navigation, however.

For example, many automobiles have recently been equipped with electronic distance measuring mechanisms to assist a driver attempting to park the vehicle. In some implementations, relatively rudimentary radar, ultrasound, infrared (IR) or other sensors may be employed, for example, at or near the rear bumper; when the vehicle is in a reverse gear, the sensors may measure distances to objects disposed in a "blind spot" or that might otherwise be difficult to observe from the driver's seat. Such systems typically employ an audible warning mechanism in which changes in tone or frequency, for example, may provide an indication of an obstacle's distance from the sensors. More sophisticated automated systems may employ various sensors that seek to enable an automobile to park itself automatically, i.e., without driver intervention, in some situations, such as during parallel parking.

Some automobile manufacturers are working to develop "smart cruise control" functionality, which attempts to control throttle and braking systems in order to maintain a safe following distance, for example, as a function of speed and other traveling conditions. With the recent introduction of high resolution display panels into automobile instrument clusters (to display various information from audio entertainment selections to detailed navigational information and global position system (GPS) data), it may be desirable in some instances to incorporate display of critical information relying upon distance measurements into automobiles and other vehicles.

Distance measuring equipment may have utility in connection with any type of moving vehicle and in any of various environments. In addition to the robot and automobile examples described above, for instance, a fork-lift operating in a warehouse may benefit from installation of accurate distance measuring systems, particularly since operator visibility may be restricted in many circumstances. Additionally, various types of sensing technology may have utility in stationary, or "fixed," applications, i.e., where a fixed sensor is operative to detect motion in its operating environment. For example, some industrial safety systems may employ a "safety curtain" in which a sensor (or a sensor array) may provide a warning in the event that a person or moving equipment approaches dangerous machinery. In other examples, sensors or sensor arrays may be fixed at a turnstile, a safety check point, a toll-booth, or other area to be monitored; such systems may be employed to detect and to count people or vehicles passing through a particular area of space.

Typical distance measuring equipment is either too expensive to be practical for many applications or too large and cumbersome to be suitable for applications requiring a small form factor. Two popular laser distance sensor (LDS) devices that have limited potential for use in vehicular or other applications, the SICK LMS 200, currently marketed by SICK AG, and the Hokuyo URG-04LX, currently marketed by Hokuyo Automatic Co., Ltd., both cost an order of magnitude more than the simplest home and commercial robot cleaners, making them unsuitable for such uses. Additionally, these devices rely upon spinning mirrors for scanning operations, and consequently require attendant lenses and other optical components; the resulting large form factors and limited resolution and range tend to make most of these devices unsuitable for automotive or other large-scale applications.

Therefore, it may be desirable to provide a laser distance sensor system and method capable of acquiring accurate distance data in a compact, robust package.

SUMMARY

Embodiments of the present invention overcome the above-mentioned and various other shortcomings of conventional technology, providing a distance measuring system and method employing a laser distance sensor having utility in various applications. In accordance with one aspect of the present invention, a laser distance sensor may acquire accurate distance measurements with a short baseline.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

Figure 1:
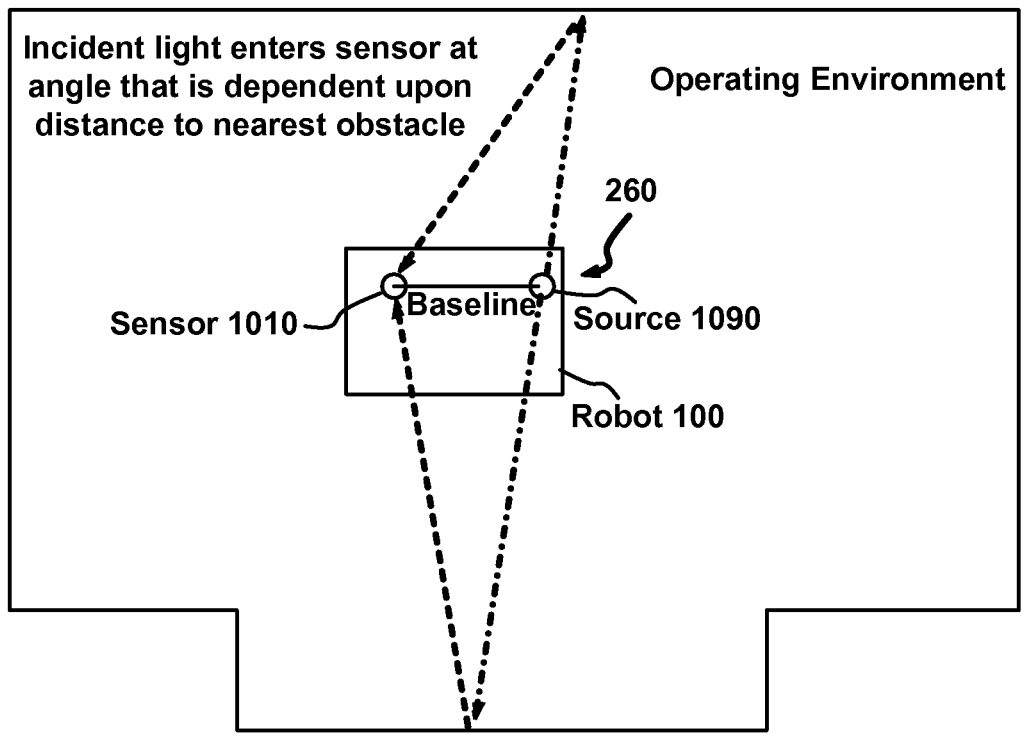
FIG. 1 is a simplified diagram illustrating a top view of a robot employing one embodiment of a distance sensor.

Some robotic systems, such as those disclosed in the related co-pending United States patent applications, for example, may use laser rangefinders to facilitate mapping and localization functionality. While manufacturing costs and power requirements associated with the various components represent impediments to development and deployment of low-cost, efficient robot platforms for consumer or commercial use, the foregoing applications and the present specification address solutions that make laser rangefinding technology practical in various contexts. In that regard, it is noted that laser distance sensor (LDS) technology has certain advantages that make it suitable for, among other implementations, indoor and outdoor mobile robot or automobile rangefinding applications.

While many sensor technologies (with varying degrees of complexity) may be utilized for acquiring distance data, LDS systems efficiently provide data in readily useable form. For example, an LDS outputs distance data, directly; i.e., it provides information related to distance between the LDS and objects in its field of view. This direct measurement functionality may be distinguished, for example, from vision sensor technologies, which compute distances indirectly from acquired image data; accordingly, these systems typically require sophisticated imaging hardware as well as complicated (and generally error-prone) image data processing and other computational overhead in order to measure distances. Unlike other types of distance measuring equipment such as systems relying upon ultrasonic transducers or IR sensors, an LDS is capable of fine angular and distance resolution, real-time acquisition of a vast number of data points (hundreds or thousands of point measurements per second), and low false positive and negative rates. Further, efficient mapping and localization algorithms exist for use in conjunction with LDS scan data.

As is generally known, the accuracy with which triangulation-based LDS systems acquire data may be limited by the overall size of the sensor device. In particular, the baseline, i.e., the distance between the source laser and the sensor or position sensing device (PSD), may affect both accuracy and range. In general, within a certain range of distances, accuracy and range of an LDS may vary directly proportionally to the baseline, i.e., as the baseline decreases, accuracy and range of the device decrease. Accordingly, designing and implementing a small-scale LDS that performs as well as a larger device with a longer baseline is challenging.

A laser distance sensor system and method as set forth below may utilize a compact, planar LDS that has capabilities comparable to larger, more expensive laser scanners: as great as about 1 cm-3 cm accuracy out to ranges of about 6 m; rapid acquisitions of approximately 4 kHz or greater with full 360 degree scans of about 10 Hz or greater; and angular resolutions of about 1 degree or less over a full 360 degree scan with angular errors of about 0.25 degrees or less. In addition, the LDS embodiments set forth below may include some or all of the following characteristics: the laser employed may be eye-safe in accordance with applicable safety standards; the systems and methods may be operative under standard indoor lighting conditions and some outdoor conditions; a short baseline may enable the LDS sensor to be small in size; and the system may exhibit low power consumption requirements of 2 W or less.

It will be appreciated that the embodiments illustrated and described herein may have utility in various robotic devices capable of autonomous localization and mapping as well as in connection with numerous other applications including, but not limited to, automotive or vehicular applications benefiting from relatively short- to medium-range distance measurements. Other examples include construction site applications (e.g., surveying or otherwise monitoring a group of buildings or a room), industrial "safety curtain" applications, area monitoring for people or vehicle counting applications, and the like.

Implementation

Figure 2:
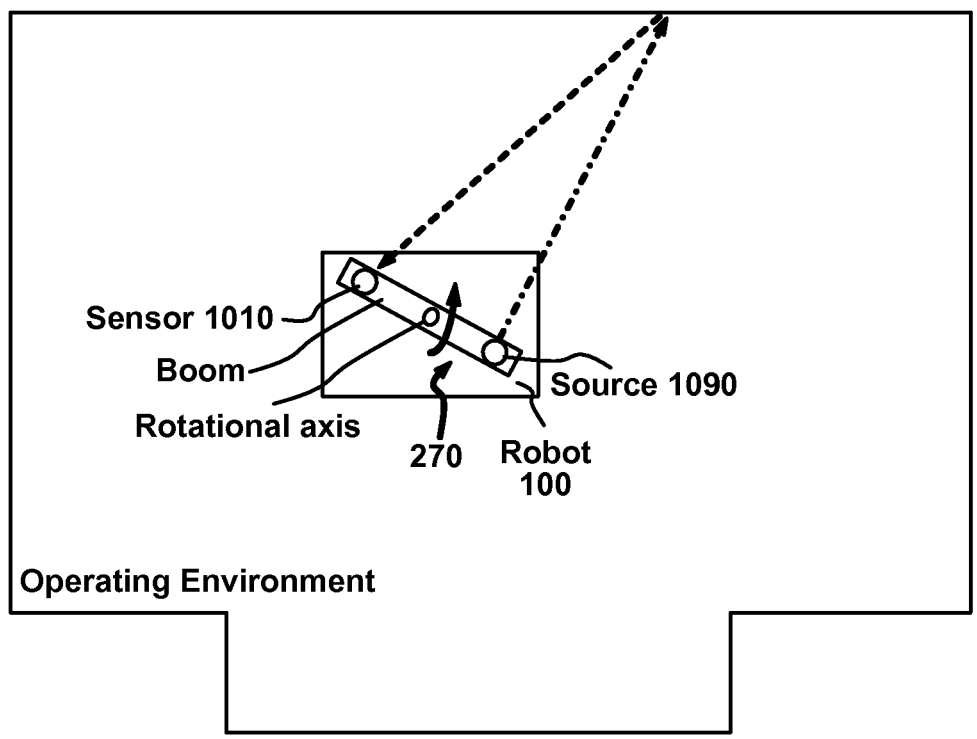
FIG. 2 is a simplified diagram illustrating a top view of a robot employing an alternative embodiment of a distance sensor.

With reference now to the drawing figures, FIG. 1 is a simplified diagram illustrating a top view of a robot employing one embodiment of a distance sensor, and FIG. 2 is a simplified diagram illustrating a top view of a robot employing an alternative embodiment of a distance sensor.

In FIGS. 1 and 2, robot 100 may be embodied in any of various autonomous, self-propelled devices designed and operative to perform a task. In some typical home and commercial implementations, robot 100 may be configured to perform sweeping, vacuuming, mopping, or waxing functions; similarly, some embodiments of robot 100 may be capable of performing yard or garden care functions such as mowing and raking. As illustrated and described in the related co-pending applications, robot 100 may be selectively configured to perform any one of a number of different tasks. It will be appreciated that the present disclosure and claimed subject matter are not intended to be limited by any particular structural or functional characteristics of robot 100. As set forth below, an LDS as described herein may be attached to, integrated with, or otherwise employed in conjunction with any type of moving vehicle or in any of various fixed location sensing applications such as those described above.

As indicated in FIG. 1, one embodiment of an LDS system 260 generally employs a source 1090 and a sensor 1010 separated by a distance, i.e., the baseline.

Sensor 1010 may include or be embodied in a charge-coupled device (CCD), a linear CCD, a complimentary metal-oxide semiconductor (CMOS) sensor, a position sensitive detector (PSD), or other sensor apparatus that is sensitive in the same frequency bands of the electromagnetic spectrum as output from source 1090. Some of this technology, or variations thereof, is gaining popularity in digital cameras and in other consumer electronics applications, and various types of digital camera sensing technology may be integrated sensor 1010. One example of a device suitable for use as sensor 1010 is a CMOS sensor (such as, e.g., a model number MT9V032 sensor currently marketed by Micron Technology, Inc.), though other types of sensor technology may be employed as noted above.

Source 1090 may comprise or be embodied in a laser, for instance, or any other source that produces electromagnetic energy within the band of the spectrum that is detectable by sensor 1010. In some circumstances, accurate distance measurements may benefit from highly collimated light. While a light emitting diode (LED) may be employed with collimating optics, for example, a laser may be more efficient, effective, or both. As described herein, source 1090 will be referred to as a laser, though other types of electromagnetic sources (either currently available or developed in the future) may also be suitable to achieve similar results. The output of source 1090 may be visible or invisible to the human eye. One example of a suitable source 1090 is a short wavelength laser diode (such as, e.g., a model number SLD-650-P5-300-05 currently marketed by Union Optronics Corporation), though other devices may also enable accurate distance measurements as set forth below.

It may be desirable to utilize source 1090 that is capable of producing variable output in differing frequency bands, as color and reflectivity of illuminated objects may affect distance measurements using some methodologies by influencing the quality and characteristics of light received by sensor 1010. Shifting output of source 1090 to a different frequency may produce more accurate results in some cases. Additionally or alternatively, a filter operative to attenuate certain frequencies while transmitting others may be utilized to produce similar effects.

Further, source 1090 may include an optics package, such as are generally known in the art for collimating or otherwise affecting the properties of emitted light. Such an optics package may employ one or more fixed focus lenses, active focus control apparatus, light collimators, beam splitters, apertures, mirrors, selective band pass filters, or various combinations of these and other components. As set forth in more detail below, sensor 1010 may comprise or be implemented in combination with various configurations of an optics package 1019 as well.

In some embodiments, output from source 1090 may be caused to rotate. In that regard, a dedicated motor in robot 100 may be employed to provide desired rotation of source 1090 itself or of selected elements of an optics package. Source 1090 may be rotated as a whole, for example, or a particular element of optics package (such as a mirror or a beam splitter) may be rotated. Those of skill in the art will appreciate that creating a rotating beam from conventional light sources and other optics components may be accomplished without inventive faculty.

In operation, source 1090 and sensor 1010, or their respective optics assemblies, may be so disposed on robot 100 as to have a full 360 degree view of the operating environment. Accordingly, a beam from source 1090 may be continually or intermittently rotated in a 360 degree pattern about an axis normal to the surface upon which robot 100 is placed; alternatively, a beam may be swept back and forth across an arc of less than 360 degrees. Additionally or alternatively, output from source 1090 may be actively aimed in a particular direction momentarily. Each of the foregoing options may be useful for acquiring data that facilitate distance measurements.

Projected light from source 1090 may reflect off objects in the operating environment, and may be received by sensor 1010 at a measurable angle. Where the relative position and spatial orientation of source 1090 and sensor 1010 are known and recorded or otherwise stored in electronics associated with robot 100, LDS system 260 may facilitate accurate positioning of robot 100 by allowing precise distance computations. In that regard, positional and navigational processing may be executed by electronics integrated with robot 100, for example, taking into consideration both the known geometry of sensor 1010 relative to source 1090 as well as the nature and timing of signals received by sensor 1010. For example, distance may be determined through trigonometry using a combination of factors such as the known distance between sensor 1010 and source 1090 (i.e., the baseline), the angle of reflected light detected by sensor 1010, the speed of robot 100, the time delay between production of the beam by source 1090 and its subsequent reception at sensor 1010, discrepancies between sequential measurements, and so forth. The angle at which light enters sensor 1010 generally varies over time as a function of robot 100 movement and due to rotation of the beam produced by source 1090.

The angle of light incident on a sensing surface of sensor 1010 may be determined in various ways. For example, the angle may be determined by identifying the brightest pixel in the array on the sensing surface. Alternatively, the brightest contiguous series of pixels may be utilized, such as, for example, by identifying a center or central region of the contiguous series and considering that the point of a brightest pixel. Various image processing techniques such as sub-pixel processing, interpolation, normalization, and the like, may be employed to locate a bright region on a sensing surface of sensor 1010 and to employ that region to ascertain the angle of incident light.

In some embodiments, output from source 1090 may be projected as a plane such that, when incident on a substantially vertical surface (such as a wall), the light may be detected as a substantially vertical line on that surface. Distance to different parts of the projected line may be determined by measuring the angle of light detected by sensor 1010. For example, where output from source 1090 is projected onto a surface that is vertical with respect to optical assembly 260, sensor 1010 may detect a straight vertical line. Where output from source 1090 is projected onto a surface that is not vertical, sensor 1010 may detect a line that is angled from vertical. In that regard, those of skill in the art will appreciate that source 1090 may produce a point of light or a line of light. Where a line of light is produced by source 1090, an actual respective distance may be computed with respect to the location at which respective parts of the line are projected onto a surface; i.e., a plurality of distance measurements may be made, each of which may correspond to a particular portion of the projected line of line. In the foregoing manner, a three-dimensional depth map may be constructed for a 360 degree scan of the operating environment.

Given the arrangement of components of LDS system 260, various methodologies may be employed to detect distance to objects. So called "time-of-flight" and triangulation computations, for example, generally have utility in calculations based upon relative positions of components, angular orientation, speed, and multiple measurements. Another method may employ measuring an amplitude of reflected electromagnetic energy that is incident on sensor 1010. In that regard, where output from source 1090 is lased or other highly collimated light, the material, color, and reflectivity characteristics of an illuminated object may affect the amplitude of light detected by sensor 1010 that is reflected off of that object; accordingly, distance measurements acquired in this manner may be extremely accurate, or may suffer from significant inaccuracies due to limitations of this sensing methodology, depending upon the composition of the object that is illuminated.

One strategy for counteracting this shortcoming includes illuminating an object with independent sources of light of differing types, such as a laser (or other source of collimated light) and an LED (or other source of diffuse light). Alternatively, source 1090 may be implemented to produce lased light of varying frequencies. Measurements of reflected light of different types may enable electronics associated with robot 100 to account for amplitude fluctuations detected in the returned collimated light, such as may be caused by color, reflectivity, or other characteristics of the illuminated object. In the foregoing manner, use of different frequencies may facilitate, for example, error correction, normalization, or other calculations having utility in assessing the amplitude (and amplitude variations) of detected collimated light.

Accuracy of distance measurements computed as set forth above may be influenced by the regularity and the frequency with which they are obtained. Accordingly, in one embodiment, source 1090 remains operative permanently to produce a continuous beam; sensor 1010 may take instantaneous readings of received light at periodic intervals; in some instances, the shorter the interval between successive measurements, the more accurate the measurements may be. As an alternative, where sufficient processing power is available, sensor 1010 may operate continuously to monitor changing signals in real time as robot 100 dynamically changes its orientation. Alternatively, source 1090 may provide intermittent or pulsed output; as in the previous embodiment, sensor 1010 may operate continuously, though distance measurements may only be acquired when source 1090 outputs a pulse. As another alternative, sensor 1010 may be synchronized with a pulsing source 1090, such that sensor 1010 only takes exposures when a pulse is projected by source 1090. In such embodiments, any of various types of synchronization mechanisms may be employed to time the intermittent operation of source 1090 and sensor 1010. For example, a microprocessor or microcontroller may provide appropriate driving signals to source 1090 and sensor 1010 to synchronize operations; additionally or alternatively, an optical encoder or other electromechanical synchronization mechanism may be employed.

As noted above, sensor 1010 may be employed in conjunction with an optics package. In some situations, it may be desirable that the optics package includes a narrowband optical filter that operates at substantially the same frequency as the output from source 1090; in such embodiments, the brightest light detectable by sensor 1010 will generally be the light projected by source 1090. It will be appreciated that such a filter strategy may not be desirable for certain applications.

Those of skill in the art will appreciate that the implementation and structural arrangement of components of source 1090 and sensor 1010 (and any attendant optics packages) are susceptible of numerous variations. For example, one or more cameras with conventional lenses may be utilized at sensor 1010; if 180 degree "fisheye" lenses are utilized in an optics package, two sensors may cover an entire 360 degree region. Rather than employing an optics package to rotate a beam from source 1090, a fixed light source may be employed on a rotating platform external to robot 100; sensor 1010 may also be mounted on such a rotating platform as indicated in FIG. 2.

In the FIG. 2 embodiment, LDS 270 may comprise a rotating platform or boom upon which sensor 1010 and source 1090 are mounted. In operation, source 1090 may be fixed with respect to a longitudinal axis of the boom, for example, such that rotation of output may be effectuated by rotation of the boom about an axis of rotation. This arrangement may simplify source 1090 and sensor 1010 (and any attendant optics packages) such that the need for internal spinning mirrors or other rotating assemblies is minimized or eliminated. As depicted in FIG. 2, it may be desirable for source 1090 and sensor 1010 to be disposed on opposite sides of the axis of rotation of the boom.

Figure 3A:
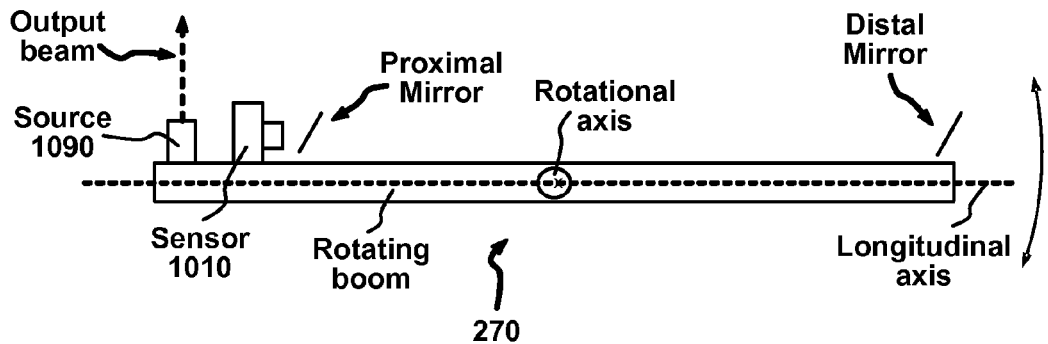
FIGS. 3A and 3B are simplified diagrams illustrating a top view of another alternative embodiment of a distance sensor.
Figure 3B:
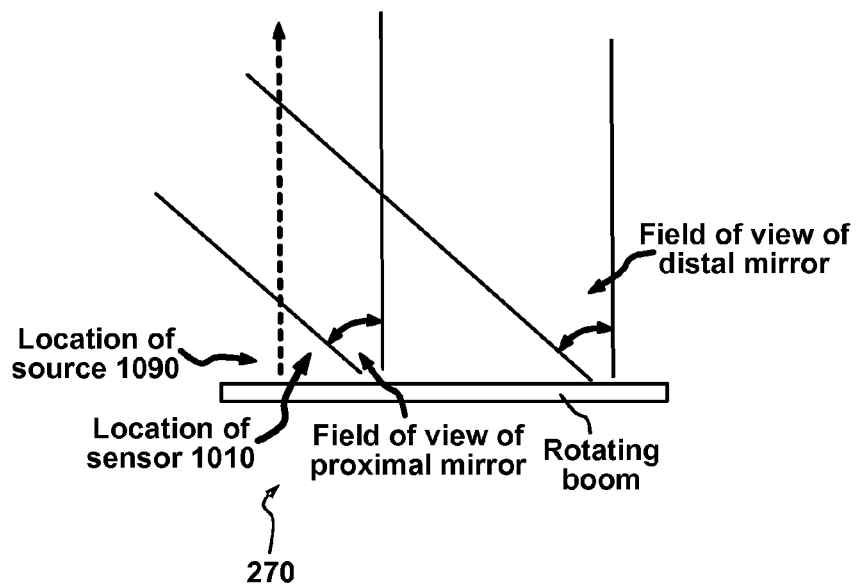

FIGS. 3A and 3B are simplified diagrams illustrating a top view of another alternative embodiment of a distance sensor. As illustrated, both source 1090 and sensor 1010 of LDS system 270 may be situated on the same side of the boom's axis of rotation. A proximal mirror, used to detect near objects, for example, may be positioned relatively close to sensor 1010; conversely, a distal mirror, used to detect distant objects, for example, may be positioned relatively far from sensor 1010. In the illustrated embodiment, the proximal mirror and the distal mirror may be positioned at different heights (e.g., along the rotational axis illustrated in FIG. 3A) to allow a respective portion of a sensing surface at sensor 1090 to detect light from each respective mirror.

It will be appreciated that the differing views for the proximal and distal mirrors may be used to facilitate both long and short distance detection modalities; light from the mirror having the more appropriate view for a particular object may be utilized for distance computations. For example, a position of a laser dot as viewed through the proximal mirror may be used to determine distance to nearby objects, whereas a position of a laser dot as viewed through the distal mirror may be used to determine distance to far-away objects. Accuracy of detection at far distances may be greater through the distal mirror than through the proximal mirror due to the view associated with each respective mirror, collimating characteristics of the mirrors, and other factors. Additionally or alternatively, when both mirrors detect an object (such as an object in a location where the mirrors' fields of view overlap as illustrated in FIG. 3B), measurements from both mirrors may be employed to compute an average, for example, or to cross-check one measurement against another.

Embodiments of robot 100 implementing an LDS system such as set forth above may be particularly efficient at thoroughly and systematically covering an entire operating environment. In that regard, robot 100 may be guided or influenced by suitable electronics based, at least in part, upon data related to distance measurements acquired by LDS system 260 or 270. Various versions of simultaneous localization and mapping (SLAM) techniques may have utility in such applications, and the present disclosure and claimed subject matter are not intended to be limited by any particular data processing operations executed with respect to acquired distance data.

Figure 4A:
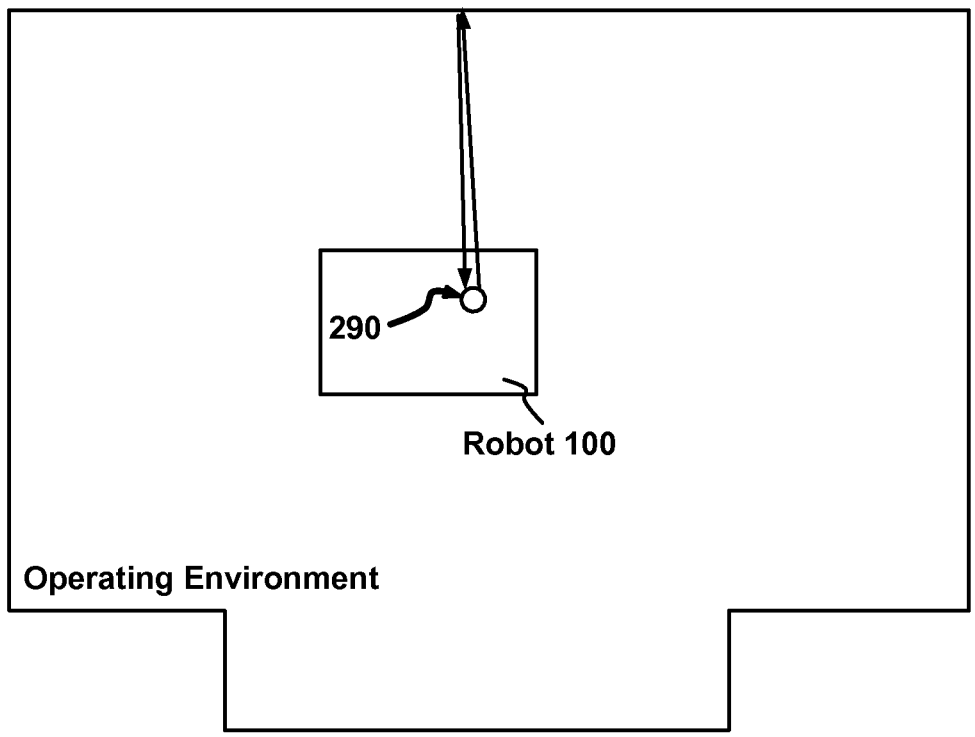
FIGS. 4A and 4B are simplified diagrams respectively illustrating top views of a robot employing another alternative embodiment of a distance sensor and components of the distance sensor.
Figure 4B:
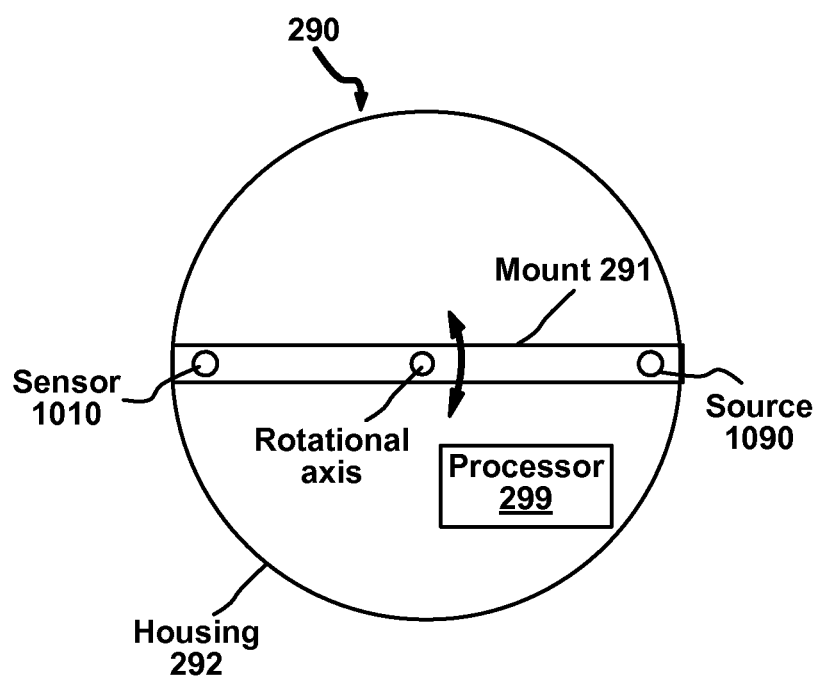

FIGS. 4A and 4B are simplified diagrams respectively illustrating top views of a robot employing another alternative embodiment of a distance sensor and components of the distance sensor. In this embodiment, LDS 270 illustrated in FIG. 2 has been modified into a small form factor; robot 100 generally comprises, among other things, an LDS system 290 having an appreciably shorter baseline than the embodiment of LDS system 270 illustrated in FIG. 2.

In one embodiment, LDS system 290 generally comprises a source 1090 and a sensor 1010 secured or attached to a mount 291. Mount 291 may rotate about a rotational axis within a housing 292. In that regard, mount 291 may be coupled to a suitable motor (such as a stepper motor, a brush motor, a direct current (DC) motor, or other electric motor) capable of providing rotation, either directly or through an appropriate gearing mechanism; alternatively, mount 291 may be coupled to an appropriate gearing mechanism cooperative with robot 100 such that rotation for mount 291 may be provided responsive to motion of robot 100, e.g., as a function of rotation of wheels or tracks on robot 100. LDS system 290 may receive electrical power to drive such a motor from an external source, for example, disposed in robot 100; alternatively, LDS system 290 may comprise or otherwise incorporate an internal power supply, such a rechargeable battery, for example.

In some circumstances, it may be desirable to rotate mount 291 a full 360 degrees at rates of up to 10 rotations per second; additionally or alternatively, mount 291 may rotate less than 360 degrees, and may sweep through a predetermined or dynamically adjusted arc in both clockwise and counter-clockwise directions. Various types of motors and rotating assemblies are generally known in the art that may be suitable to provide such rotation for mount 291. In some embodiments, mount 291 may be rotatable through an arbitrary number of 360 degree unidirectional rotations; this may be accomplished, for example, using inductive power and data couplings or a slip ring.

Housing need not be circular in plan view as illustrated in FIGS. 4A and 4B, though circular embodiments may be easy and efficient to implement given rotation of mount 291. Housing 292 may be attached to, and project from, a surface of robot 100 such that source 1090 and sensor 1010 project far enough from the surface to operate, i.e., such that the light emitted by source 1090 and received by sensor 1010 is not obstructed, obscured, or otherwise attenuated by structural elements of robot 100. Housing 292 may comprise a substantially transparent window or protective covering to minimize the likelihood that performance of source 1090 and sensor 1010 may deteriorate due to particulate or other contamination. Such a window or protective covering may be constructed of material (such as a plastic, acrylic, or sapphire, for example) that has suitable optical characteristics to allow light at the operative frequencies of source 1090 and sensor 1010 to pass substantially unattenuated, i.e., such that the performance characteristics of sensor 1010 and source 1090 are not significantly diminished. The material used for such structures may be selected in accordance with the particular sensing technology employed. It will be appreciated that such a substantially transparent window may be incorporated into the structure of housing 292, and may extend a full 360 degrees in some embodiments, allowing source 1090 and sensor 1010 to acquire distance measurements from 360 degree scans.

LDS system 290 may additionally comprise a processor 299 providing internal or "on-board" computational functionality. Processor 299 may be embodied in or comprise any of various types of computing hardware such as single- or multi-core microprocessors, microcontrollers, programmable logic controllers, application specific integrated circuits (ASICs), field programmable gate arrays (FPGAs), and other types of data processing engines.

In some embodiments, processor 299 may be designed and operative to support the functionality of source 1090 and sensor 1010 and to provide distance measurement data to an external device or processor (such as disposed on robot 100, for instance) for additional processing and distance computations. Alternatively, processor 299 may be sophisticated enough to perform all necessary or desired distance calculations, the results of which may be provided to an external device or processor. In that regard, processor 299 may be in data communication with additional processing resources (i.e., external to LDS system 290) either wirelessly or via a data line. In wireless embodiments, processor 299 may communicate utilizing the Bluetooth standard, for example, or the Institute of Electrical and Electronics Engineers (IEEE) 802.11 standard, though other standards and communications protocols may also be employed.

It will be appreciated that LDS system 290 may comprise additional components to facilitate execution of various necessary or desired operations. As set forth below with reference to FIG. 9, for example, LDS system 290 may include memory and appropriate drive electronics to control or otherwise to influence operation of source 1090 and sensor 1010 responsive to, for instance, data received from an optical encoder.

As set forth in more detail below, LDS system 290 may represent an innovative laser point sensor module that works on the triangulation principle, using source 1090 projecting a laser point beam and sensor 1010 comprising a line sensor, separated by a short baseline. In some embodiments, LDS system 290 incorporates source 1090, sensor 1010, any attendant optics or optical components, and processor 299 in a small, rigid package; in that regard, LDS system 290 may be slightly larger than currently available IR distance sensors, but may provide substantially superior performance characteristics such as accuracy and speed.

As noted above, LDS system 290 may be in data communication with external devices, processing resources, or other computer systems. Such data communication may be via wireless RF protocols such as Bluetooth or IEEE 802.11, for instance, or via any number of different data communication methodologies. By way of example, data communication may be effectuated via carrier current on a power supply line or via optical or other types of data lines, for instance, provided through a slip ring or other mechanism. Alternatively, data may be provided inductively, for example, taking advantage of the rotation of mount 291. Similarly, power for the various components of LDS system 290 may be supplied inductively or through a slip ring.

In that regard, it will be appreciated that mount 291 may not be limited with respect to its rotation. By employing a slip ring or inductive couplings, for example, mount 291 may be enabled to rotate through an arbitrary number of rotations in a particular direction.

Regarding data communication, it will be appreciated that LDS system 290 may provide raw data or distance measurements to any of various external systems. In some embodiments, such data may be supplied to a navigational system of robot 100 (such as illustrated in FIGS. 1, 2, and 4A) or to some other sort of autonomous vehicle. Alternatively, LDS system 290 may provide data to a "people-counting" system (e.g., employed at a sports or entertainment venue, a court house, an airport, a toll-booth, or the like), a "safety curtain" proximity warning system (e.g., for use in industrial or other commercial settings), residential or commercial alarm systems, and various other fixed location sensing systems.

In some embodiments, LDS system 290 may provide data related to distance, or actual distance measurements, to an electronics module disposed in a vehicle such as an automobile. Depending upon the sophistication of the electronics module and capabilities of one or more navigational systems or system components, for instance, such a vehicle may incorporate LDS system 290 and data acquired therefrom to navigate, or to drive or park itself, autonomously, for example. Alternatively, integration of distance data into a navigation system or safety system may be provided for use in conjunction with a monitor or display in the vehicle. For example, many navigational aids provide maps or other displays to assist a driver in arriving at a particular location; while such systems are equipped to display streets, for example, they cannot display obstacles. A vehicle electronics module may readily be adapted to incorporate distance data received from LDS system 290 and to display a plan view or three-dimensional perspective view of the area around the vehicle such that adjacent vehicles, fire hydrants, telephone poles, guard rails, and the like are displayed in their locations relative to a representation of the vehicle. In that regard, a vehicle incorporating LDS system 290 and using distance data to provide a visual aid or other distance related information to an operator may be particularly safe to operate while parking, for instance, and while driving in fog or other adverse conditions.

Triangulation Technology

All currently available single-point scanning sensors (such as the SICK and Hokuyo devices noted above) use mirrors to scan the point sensor. These devices are generally configured as time-of-flight distance sensors, i.e., they measure the time required for light to travel to an object and to be reflected to the sensor. An alternative technology is triangulation. As noted above, in accordance with triangulation methodologies, the distance to an object may be measured as a function of the angle of light reflected from an object.

Figure 5:
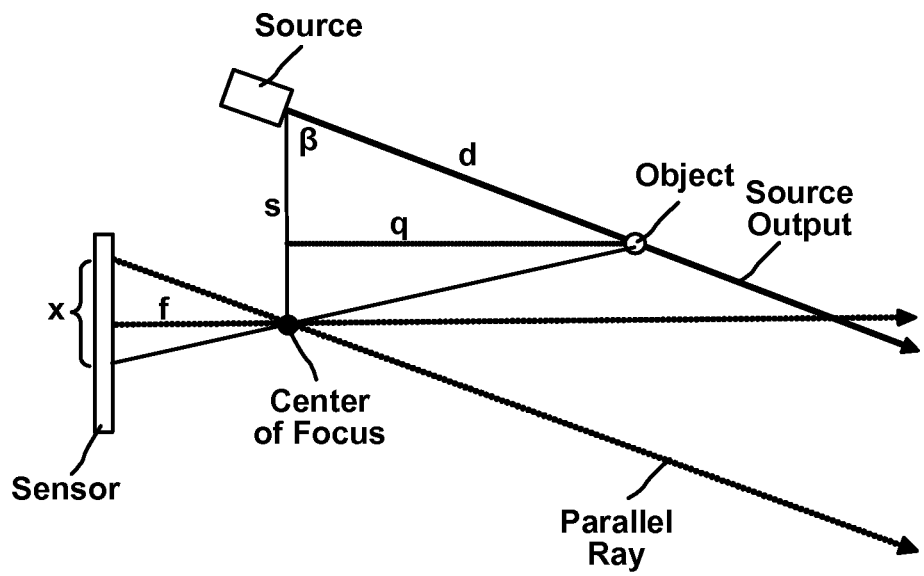
FIG. 5 is a simplified diagram illustrating basic geometry that may be employed in triangulation.

FIG. 5 is a simplified diagram illustrating basic geometry that may be employed in triangulation computations. A source produces a small point of light (such as lased or otherwise collimated light), which reflects off an object and onto an image plane of the sensor; the light incident on the image plane of the sensor is often referred to as a "dot." An ideal pinhole camera or other sensor may be oriented so that the beam produced by the source is parallel to the ray through the center of focus to the edge of the useable portion of the image plane. This structural arrangement enables an LDS to compute distance measurements from infinity (at one edge of the image) to a minimum distance, $q_{min}$, (at the other edge of the image) by ascertaining the location of the dot. From similar triangles, the perpendicular distance, q, to the object from the center of focus is defined as follows:

$$q = \frac{fs}{x} \quad \text{(Eq. 1)}$$

where f is the focal length, s is the baseline, and x is the distance measured between the ray parallel to the source beam and the ray returned from the object. The distance to the object may therefore be ascertained as a function of the angle (affecting the location) of the dot in the image reflected from the object.

Further, the distance, d, to the object along the source output ray depends upon the angle, β, of the source with respect to the image axis:

$$d = q/\sin(\beta) \quad \text{(Eq. 2)}$$

Equations 1 and 2 show the hyperbolic relationship between image distance (i.e., distance measured on the image plane of the sensor) and object distance that is a property of triangulation. This nonlinear relationship can pose difficulties with respect to determining longer distances, since the range sensitivity grows quadratically with distance as follows:

$$\frac{dq}{dx} = -\frac{q^2}{fs} \quad \text{(Eq. 3)}$$

For example, if a displacement in the sensor of a single pixel (i.e., on the sensor's array) corresponds to a 1 cm distance displacement at 1 m, then the same single pixel displacement of the image on the sensor would correspond to a 4 cm displacement at 2 m.

As noted above, the criteria consistent with good minimum distance performance (from Equation 1) and the criteria consistent with good range resolution (from Equation 3) are generally counter-balancing, i.e., a small fs product provides a small $q_{min}$, whereas a large fs product provides better range resolution.

The relative weight provided to the product of fs in distance computations may depend upon, or may otherwise be determined or influenced by, the capabilities and functional characteristics of the sensor employed. In some embodiments, the sensor may have a short exposure time (e.g., to improve ambient light rejection) and a large number of pixels (e.g., to allow for fine resolution of x). In one embodiment, a global-shutter CMOS sensor with 752 pixels of resolution and a minimum shutter time of 35 μs may be sufficient for many applications; in this case, each pixel is approximate 6 μm, and sub-pixel interpolation processing may allow for effective resolution within 0.1 pixel or better.

Figure 6:
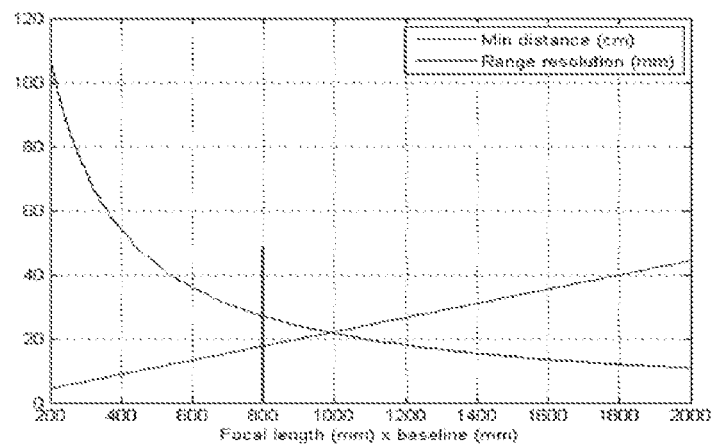
FIG. 6 is a representative graph illustrating the effect of the product of focal length and baseline on the performance characteristics of a laser distance sensor.

FIG. 6 is a representative graph illustrating the effect of the product of focal length and baseline on the performance characteristics of a laser distance sensor. Given the foregoing parameters, the effect of fs on range resolution and minimum distance may be plotted as indicated in FIG. 6, with range resolution decreasing and $q_{min}$ increasing as the fs product increases. If $q_{min}$ is to be 20 cm or less (which may be desirable for some small scale robotic applications, for example), fs should be 900 or greater. If the range resolution is to be 30 mm or less at 6 m, the fs product should be greater than 700. An fs product of 800 may be selected as a good compromise for many implementations, though it will be appreciated that this product may be selected in accordance with the type of use for which the LDS system is intended.

The product fs=800 may be achieved in different ways, but for small scale applications, it may be desirable to provide a short baseline (as set forth above) while keeping the focal length reasonable (longer focal lengths generally require longer lenses). As an example, with a baseline of approximately 50 mm, the focal length may be approximately 16 mm.

The angle, β, of the source output relative to the optical axis may be computed as follows:

$$\beta = \arctan(f/(376 \ast 6 \, \mu m)) \approx 82° \quad \text{(Eq. 4)}$$

The total error of an LDS system may be a function of the various parameters set forth above, any error in dot resolution at the sensor, calibration procedures, or a combination thereof. The term "calibration" in this context may generally refer to any misalignments of the various components. Such misalignments that may affect overall LDS operation include the mounting angle of the source (e.g., a laser diode), the mounting angle of the sensor (or an associated lens), and any distortion introduced by lenses or other optical components at the sensor.

With respect to the relative mounting angles of the source and the sensor, it is noted that the illustration of FIG. 5 generally depicts the source beam and the lens principal ray (i.e., the parallel ray) generally residing in the same plane. While this is ideal, in practice, it may not always be the case. During calibration, the horizontal scanline (e.g., in the sensor) that best corresponds to the location of the source beam at all distances may be sought. During operation, the LDS may employ some number of scanlines above and below this midpoint line on the sensor. For example, the LDS may rely upon data at eleven lines of pixels on the sensor array (i.e., CCD or CMOS) representing the calibrated scanline as well as five lines above and five lines below; other combinations (including even numbers) of lines may be utilized in operation. If the sensor is not rotated excessively relative to the plane of the source and the focal point, eleven lines may be sufficient to approximate the ideal planar geometry.

With respect to lens distortion, it is noted that for a 16 mm lens, typical distortion may be limited to a few percent at the edge of the field of view, especially when optimizing for a single wavelength of incident light. When calibrating an LDS having such a lens associated with the sensor, such lens distortion may be ignored; as an alternative, test readings at or near the limit of the intended range may be weighted more heavily than test readings acquired closer to the sensor.

In accordance with some embodiments, therefore, an LDS may be calibrated by locating a center scanline that best identifies the source beam at various distances and employing a band of scanlines around the center scanline to localize the dot reflected to the sensor. For a set of readings at known distances, the curve described by Equation 1 may be fit, in which distant readings may be weighted more heavily than close readings. Two parameters (the product fs, and the pixel offset for calculating x) may be optimized for subsequent use during distance measurement acquisition. It will be appreciated that the foregoing is provided by way of example and not by way of limitation; various other methods of calibrating an LDS may be appropriate depending upon, for example, the capabilities of the sensor employed, the wavelength of the light employed, the power output of the source, the structural characteristics of the mount upon which the sensor and source are disposed, or a combination of these and other factors.

For example, an LDS system may be capable of detecting an out of calibration condition and may further be configured and operative to execute self-calibration procedures, either independently or with operator intervention. When output from the source is incident on a relatively long section of straight wall, for instance, the sensor will detect readings that represent a variety of lengths along the wall as the mount rotates; such distance readings will range from relatively short (e.g., at the area of the wall proximate the LDS system such as when the output is normal to the surface of the wall) to relatively long (e.g., further along the wall from the LDS system) as the angle of rotation of the mount changes. If the LDS system were properly calibrated, appropriate processing of acquired data should result in detection of a straight wall. If the LDS system were improperly calibrated, however, processing operations may result in apparent detection of a symmetrically curved wall, indicating an out of calibration condition. In some instances, detection of apparent curvature may be due to the performance characteristics discussed above with reference to Equation 3. Given the architecture of an LDS as described herein, shorter readings tend to be more accurate, whereas longer readings tend to be less accurate. Where longer distance readings are all inaccurately high, or all inaccurately low, an LDS system may detect what appears to be a generally uniform and symmetrical curving surface as opposed to a generally planar surface. As noted above, an LDS system may interpret such measurements as an indication that recalibration may be necessary or desirable.

In some embodiments, an LDS system may incorporate or have access to a self-calibration system capable of adjusting one or more calibration parameters to correct for structural or other deficiencies, i.e., to make the wall in the example above appear straight. Calibration be executed manually in some instances, for example, or be facilitated by operator input; in some cases, an operator may provide input instructing the LDS system to execute a calibration procedure, and may further provide input estimating a normal distance to a portion of a straight wall. Additionally or alternatively, an LDS system may invoke calibration procedures automatically upon detection of an out of calibration condition as set forth above. Such self-calibration may be based upon the assumption that it is likely that a uniformly curved wall is actually straight, and calibration parameters may be adjusted to facilitate processing accordingly. As noted above, this effect may be predictable because, for short distances, an LDS may be very insensitive to calibration, while conversely, for relatively long distances, an LDS may be very sensitive to calibration. Given reasonably expected miscalibration conditions (considering the operating environment and intended use), short or near distances may be determined to a very good accuracy, and therefore the LDS may be calibrated over the entire expected distance range from such accurate short distance measurements.

It is generally desirable that an LDS maintain the calibration under operating conditions, which may include thermal stress, mechanical shock, and other conditions that may tend to alter the structural arrangement or operating characteristics of the several components. In some circumstances, therefore, it may be desirable that the physical linkage (i.e., the mechanical connection) between lens elements, sensor, source (and any attendant optics) be rigid and exhibit low thermal expansion or distortion. Any relative movement of source and sensor may result in large errors, especially at longer acquisition distances. In practice, the greatest threat to misalignment may be relative rotation of the source and the sensor, such as may be caused by thermal expansion or mechanical shifting of the mount upon which they are disposed.

Figure 7:
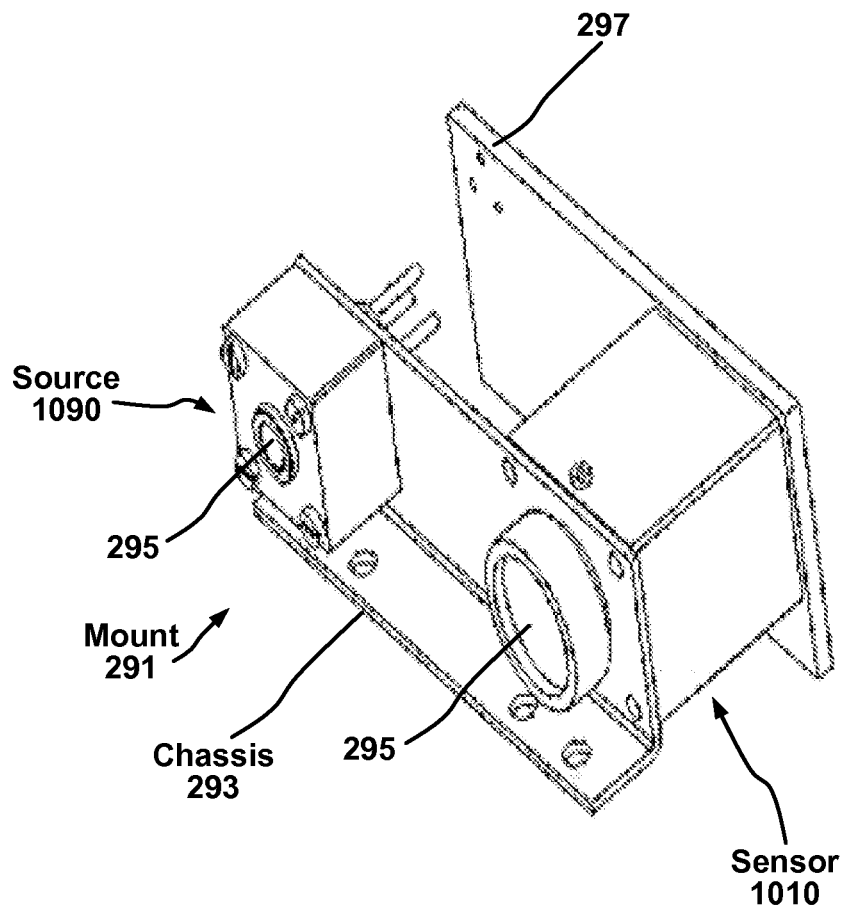
FIG. 7 is a simplified perspective view of components of one embodiment of a mount carrying a source and a sensor.

FIG. 7 is a simplified perspective view of components of one embodiment of a mount carrying a source and a sensor. In the FIG. 7 embodiment, mount 291 may be similar to that described above with reference to FIG. 4B. Mount 291 generally includes an L-shaped chassis 293, which may be constructed of steel, titanium, aluminum, nickel, or various alloys that are rigid and have low thermal expansion coefficients. Alternatively, chassis 293 may be constructed of composite materials or ceramics, for example. Any material that exhibits sufficient structural rigidity and suitable heat transfer characteristics may be employed. Mount 291 may also comprise an electronics package 297, such as may be embodied in a printed circuit board or monolithic integrated circuit (IC), for example. Electronics package 297 is described below with reference to FIG. 9.

Source 1090 and sensor 1010 may be rigidly secured to chassis 293 such as with screws or bolts, for example. In some instances, it may be desirable to weld, braze, or otherwise to permanently affix source 1090 and sensor 1010 to chassis. The present disclosure and claimed subject matter are not intended to be limited to any particular method or structural mechanisms employed to secure source 1090 and sensor 1010 to chassis 293; any mechanical or structural connection that provides sufficient rigidity and adequately prevents relative motion of source 1090 and sensor 1010 may be employed.

Lens blocks associated with source 1090 and sensor 1010 may be glass-filled polycarbonate, for example, or any other material that has a low thermal expansion and high tensile modulus. Lens elements 295 may be constructed of glass, plastic, acrylic, sapphire, or any other material having necessary or desired optical qualities as is generally known in the art. Lenses 295 may be adjusted (e.g., for focus) via threaded engagement allowing for selective modification of focal length as is known; in some implementations, it may be desirable that both lenses may be locked down by, for example, using set screws, adhesive, or a combination of these and other technologies capable of securing lenses 295 such that their focus cannot readily be altered.

As noted above, it may be desirable that source 1090 and sensor 1010 be rigidly connected to chassis 293 such that the relative angular orientation remains fixed, and the baseline remains constant, under a variety of operating conditions. Such rigidity may enable a high degree of precision in triangulation measurements, making a short baseline for LDS system 290 practical for moderate measuring distances (e.g., 6 m or more). Additionally, connecting source 1090, sensor 1010, and any attendant optics in rigid mount 291 substantially as set forth above generally obviates the need for rotating mirrors and consequent alignment and synchronization challenges.

In some operating environments, it may be possible that the image of the dot (i.e., the light returned to sensor 1010 and incident on the image plane) may be corrupted or otherwise overpowered by ambient light. Temporal filtering and wavelength filtering represent two techniques that may be employed to minimize or to eliminate this interference.

In some embodiments, a visible, red wavelength (e.g., approximately 650 nm) pulsed laser may be employed at source 1090. Lasers operating at or near this wavelength tend to yield slightly higher output (that is still eye-safe) as compared to lasers operating at IR wavelengths, for example. Additionally, a visible, red wavelength laser may allow for superior imager response at sensor 1010, and may easier to debug and calibrate than IR wavelength lasers. Where output of source 1090 is at 650 nm, a 20 nm bandpass filter implemented at sensor 1010 may reduce the ambient light flux by a factor of about 50; other types of bandpass filters may be employed, and may be application specific or otherwise selected as a function of the operating characteristics of source 1090 and sensor 1010.

Figure 8:
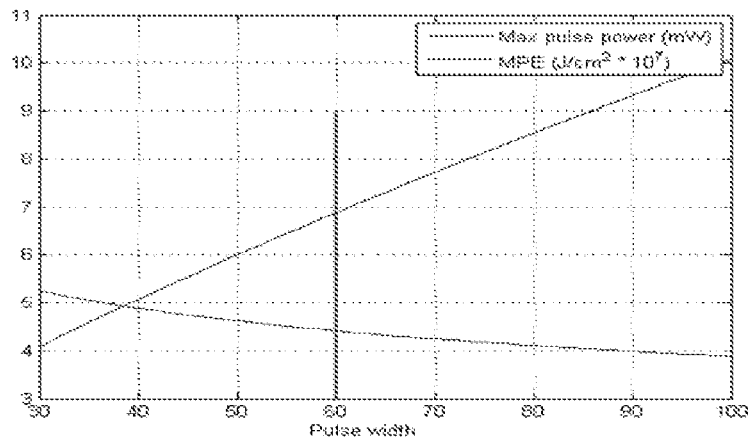
FIG. 8 is a representative graph plotting maximum permissible exposure and pulse power as functions of pulse width.

In embodiments employing temporal filtering, a global electronic shutter at sensor 1010 may be synchronized with source 1090 such that the sensor array (i.e., pixels capturing image data) is exposed only when the laser is pulsing. In that regard, an LDS system may employ a synchronization mechanism to synchronize intermittent operation of source 1090 and sensor 1010. By using short pulses, the laser power may be increased while maintaining the output at an eye-safe level. In general, applicable safety standards may not allow as much overall energy in shorter pulses as compared to longer pulses; these design considerations represent a tradeoff between ambient light rejection (favoring short pulses) and sensor response (favoring long pulses and higher total energy). FIG. 8 is a representative graph plotting maximum permissible exposure and pulse power as functions of pulse width.

As indicated in FIG. 8, the maximum permissible exposure (MPE, or total energy) for a pulse increases, whereas the maximum pulse power decreases, as pulse width increases. At a minimum exposure of 35 μs, the pulse power may be over 5 mW, which may facilitate minimizing problems associated with ambient light interference. At longer pulse durations, the pulse power drops, while the total energy available for reflection off an object rises substantially, facilitating acquisition of reflections off of darker objects. The vertical line shows these values at 60 μs, which may be a suitable pulse width for many applications.

Processing the data acquired by the sensor to provide distance measurements may involve several steps, including, but not necessarily limited to: pulsing the laser and exposing the sensor; reading out the sensor rows; processing the rows to determine the laser dot centroid; calculating the distance corresponding to the image centroid; and formatting and communicating the distance measurement.

Figure 9:
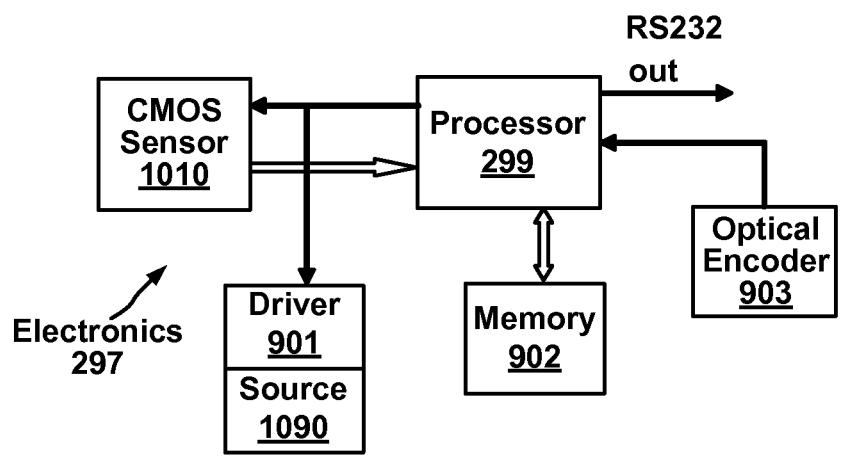
FIG. 9 is a simplified block diagram illustrating components of one embodiment of an electronics package employed in a laser distance sensor.

FIG. 9 is a simplified block diagram illustrating components of one embodiment of an electronics package employed in a laser distance sensor. In some embodiments, sensor 1010 may be embodied in or comprise a CMOS imager with integrated timing and control; accordingly, sensor 1010 may require only a frame pulse to start exposure and subsequent readout of 10 rows; the same frame pulse may initiate the output from source 1090 facilitated, for instance, by laser driver circuitry or electronics (reference numeral 901). Processor 299 (described above with reference to FIG. 4B) may be embodied in or comprise any multi-purpose microprocessor or digital signal processor (DSP); alternatively, processor may be a dedicated ASIC or other proprietary hardware engine.

In addition to providing synchronization or other control signals to sensor 1010 and source 1090 (as well as to any attendant driver circuitry such as laser driver 901), processor 299 may stream acquired data from sensor 1010 directly into internal memory (e.g., such as a cache). The data may be processed in accordance with any of various techniques generally known in the art of image processing; it will be appreciated that the methodology employed to process the data may depend, for example, upon the nature and operating characteristics of sensor 1010, overall data throughput requirements, or a combination of these and other factors. Appropriate processing techniques may be employed to ascertain the position of the dot centroid and to map the centroid position to distance substantially as set forth above.

In some embodiments, an off-chip memory (i.e., external to processor 299) may be provided to store necessary or desired program code, calibration data, or other data and instruction sets to facilitate overall operation of the LDS system. Memory 902 illustrated in FIG. 9 may generally be implemented as flash memory, random access memory (RAM), dynamic RAM (DRAM), synchronous DRAM (SDRAM), or double data rate (DDR) SDRAM, though various other types of data storage technologies may be appropriate for some applications. Where processor 299 comprises sufficient internal cache capacity, memory 902 may be unnecessary.

As noted above, it may be desirable to provide a synchronization mechanism capable of synchronizing the operation of various components. In that regard, an optical encoder 903 may provide processor 299 with data to facilitate synchronization of the intermittent operation of both source 1090 and sensor 1010. As is generally known, optical encoder 903 generally comprises a photoemitter and photodetector pair; a beam of light transmitted between the emitter and detector may be selectively interrupted, for example, as a shaft rotates. Digital pulses from optical encoder 903 may be employed by processor 299 to control duty cycles for sensor 1010 and source 1090 as the mount to which they are affixed rotates.

With reference now to FIGS. 4B, 7, and 9, it will be appreciated that various embodiments of optical encoder 903 may be employed, though an incremental rotary encoder may be desirable in many instances. In some embodiments of LDS system 290 employing a rotary encoder, the code (i.e., markings or other indicia designed to interrupt the beam between the emitter and the detector) may be integrated with housing 292 while the emitter and detector are attached to or otherwise integrated with mount 291. As mount 291 rotates, the code disposed on the stationary housing 292 may be read such that optical encoder 903 may provide digital signals to processor 299 representative of the angular orientation of mount 291 relative to housing 292.

For example, a fixed radial black-and-white (or other contrasting) pattern may be read by two reflective sensors on rotating mount 291. One of the sensors may reads an index mark or other indicia to provide information related to the nominal heading of the LDS system as a whole, while the other sensor may read a pattern designed for timing the operating cycles of source 1090 and sensor 1010. In the foregoing manner, the angular displacement of the data acquisition is relatively insensitive to variations in motor speed, allowing for less expensive motors and relaxed motor and timing controls.

The components illustrated in FIG. 9 may be suitably sized to fit on a small PCB associated with mount 291. Where appropriate operating characteristics are selected for the several components, electronics package 297 may be capable of consuming less than 1 W of power in normal operation. Power for electronics package 297, source 1090, and sensor 1010 may be supplied, for example, through a 2-wire slip ring on the rotation center (i.e., at the axis of rotation). Communications to and from electronics package 297 may be via a short-range radio frequency (RF) modem (not shown), for example, operating at 56 Kbaud or greater. Alternatively, as described above, electronics package 297, and in particular, processor 299, may communicate with external devices via data lines.

Exposure and readout may generally occur sequentially, while processing may be performed in parallel with these operations. In some embodiments, the time required to read a desired number of lines from sensor 1010 may represent the primary limitation on speed, so it may be desirable to employ a sensor 1010 implementing fast technology. With on-imager binning of lines, for example, it may be possible to perform an expose-process-readout cycle in under 0.25 ms, for a read rate of 4000 distance measurements per second.

Figure 10:
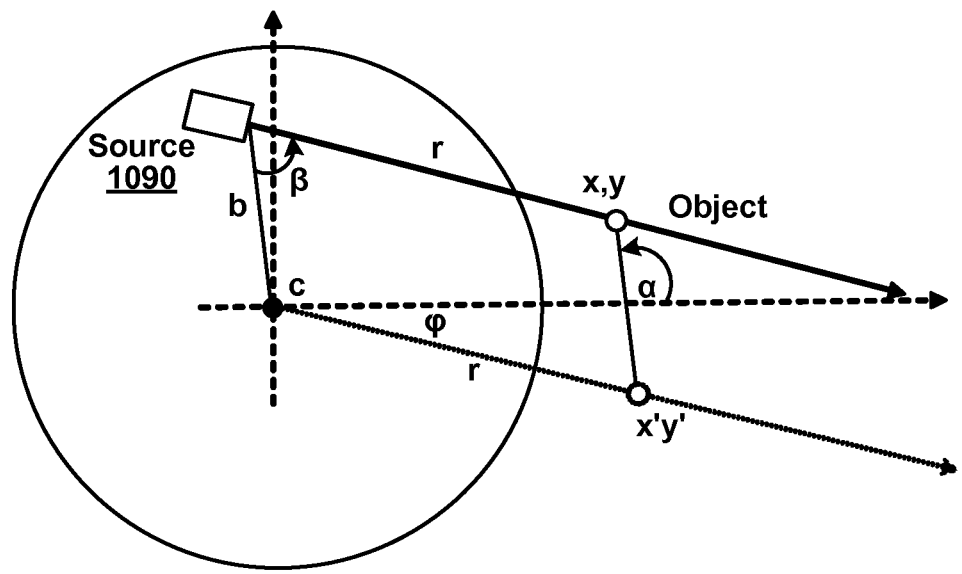
FIG. 10 is a simplified diagram illustrating rotational geometry of a laser distance sensor.

FIG. 10 is a simplified diagram illustrating rotational geometry of a laser distance sensor. To increase the field-of-view of a single-point distance sensor, the sensor apparatus, or some component thereof, must be scanned. As noted above, the typical hardware configuration for scanning triangulation sensors employs spinning mirrors both to deflect (i.e., scan) the output beam as well as to deflect the return reflections properly to the image sensor. Such an arrangement is inherently bulky and difficult to calibrate, requiring precise positioning between mirrors, sensor, and source. It is also difficult to achieve full scanning coverage—typically coverage is 180 degees or less.

By contrast, an LDS system as set forth above may be small and rigid enough to allow mechanical scanning such as described with reference to FIGS. 4B and 7. In some embodiments, the sensor and source are rotated in a plane, generating a full planar scan at about 10 Hz or greater. The mechanical arrangement described herein, without costly mirrors and consequent alignment problems, enables an LDS system to function reliably while keeping manufacturing costs low. Other arrangements are also possible, e.g., a full three-dimensional scan may be generated by measure not just a single point, but a set of points, or a laser line. This may readily be effectuated by employing a source having a line output (i.e., rather than a point beam output) and a sensor having an appropriately sized pixel array.

Mount 291 may be attached to a bearing or other mechanical element allowing rotation and spun about a rotational axis located, for example, midway between source 1090 and sensor 1010. As mount 291 rotates, it may be desirable to pulse the output of source 1090 such that a data measurement is acquired at, for example, 1 degree (of rotation) resolution. At a 10 Hz revolution rate, the foregoing strategy produces approximately 3600 measurements per second, below the maximum rate of 4000 readings per second of the sensor employed in the example above. As set forth above, it may be desirable in some instances to employ inductive power and data couplings, for example, or to employ a slip ring or other mechanical connection such that mount 291 is rotatable through an arbitrary number of uni-directional rotations. With this structural arrangement, it may not be necessary to reverse the direction of rotation for mount 291 during operation.

As indicated in FIG. 10, source 1090 is offset from the center of rotation; the x,y position of a scanned object, relative to a fixed coordinate system with origin on the center of rotation, c, is given by the following:

$$x'y' = r\cos\phi, r\sin\phi$$

$$\alpha = \pi - \beta + \phi$$

$$x,y = x + b\cos\alpha, y + b\sin\alpha \qquad \text{(Eq. 5)}$$

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A distance sensing system comprising:
   a source providing collimated light output;
   a source providing diffuse light output;
   a sensor operative to detect the outputs incident on a stationary object;
   a movable rotating mount to which said sources and said sensor are attached; said movable rotating mount being rotatable through an arbitrary number of uni-directional rotations; and
   an electronics package attached to said movable rotating mount and coupled to said sources and said sensor; said electronics package executing digital processing to process data acquired by said sensor from collimated and diffuse light hitting said stationary object as said movable mount rotates to generate distance data, said distance data related to a position of the distance sensing system relative to a stationary object in the operating environment.

2. The distance sensing system of claim 1 further comprising a synchronization mechanism to synchronize intermittent operation of said sources and said sensor.

3. The distance sensing system of claim 2 wherein said synchronization mechanism is an optical encoder.

4. The distance sensing system of claim 1 wherein the digital processing comprises executing triangulation calculations.

5. The distance sensing system of claim 1 wherein the digital processing comprises executing sub-pixel interpolation.

6. The distance sensing system of claim 1 wherein the digital processing comprises computing 4000 data points per second.

7. The distance sensing system of claim 1 wherein said source of collimated light output is a laser.

8. The distance sensing system of claim 7 wherein the laser output has a wavelength of approximately 650 nm.

9. The distance sensing system of claim 1 wherein said sensor is a complimentary metal-oxide semiconductor sensor.

10. A robotic device comprising:
    a drive mechanism to move said robotic device;

an electronics module disposed on said robotic device to provide instructions to said drive mechanism to position the robotic device in an operating environment;

an optical assembly disposed on said robotic device to provide distance data to said electronics module, said distance data related to a position of the robotic device relative to a stationary object in the operating environment and influencing the instructions provided to said drive mechanism; said optical assembly comprising:
  a source providing collimated light output;
  a source providing diffuse light output;
  a sensor operative to detect the outputs incident on the stationary object in the operating environment;
  a rotating mount to which said sources and said sensor are attached; said rotating mount being rotatable through an arbitrary number of uni-directional rotations; and
  an electronics package attached to said rotating mount and coupled to said sources and said sensor; said electronics package executing digital processing to process data acquired by said sensor from collimated and diffuse light hitting said stationary objectas said mount rotates to generate the distance data.

11. The robotic device of claim 10 wherein said optical assembly further comprises a synchronization mechanism to synchronize intermittent operation of said sources and said sensor.

12. The robotic device of claim 11 wherein said synchronization mechanism is an optical encoder.

13. The robotic device of claim 10 wherein the digital processing comprises executing triangulation calculations.

14. The robotic device of claim 10 wherein the digital processing comprises executing sub-pixel interpolation.

15. The robotic device of claim 10 wherein the digital processing comprises computing 4000 data points per second.

16. The robotic device of claim 10 wherein said source of collimated light output is a laser.

17. The robotic device of claim 16 wherein the laser output has a wavelength of approximately 650 nm.

18. The robotic device of claim 10 wherein said sensor is a complimentary metal-oxide semiconductor sensor.

19. The robotic device of claim 10 wherein said optical assembly further comprises a transmitter coupled to said electronics package; said transmitter to transmit the distance data to said electronics module wirelessly.

20. A vehicle comprising:
  a distance sensing system operative to generate distance data associated with a distance to a stationary object within a range of the vehicle; said distance sensing system comprising:
    a source providing collimated light output;
    a source providing diffuse light output;
    a sensor operative to detect the outputs incident on the object;
    a rotating mount to which said sources and said sensor are attached; said rotating mount being rotatable through an arbitrary number of uni-directional rotations; and
    an electronics package attached to said rotating mount and coupled to said sources and said sensor; said electronics package executing digital processing to process data acquired by said sensor from collimated and diffuse light hitting said stationary object as said mount rotates to generate the distance data; and
  an electronics module to receive the distance data from said distance sensing system.

21. The vehicle of claim 20 wherein said distance sensing system further comprises a synchronization mechanism to synchronize intermittent operation of said sources and said sensor.

22. The vehicle of claim 21 wherein said synchronization mechanism is an optical encoder.

23. The vehicle of claim 20 wherein the digital processing comprises executing triangulation calculations.

24. The vehicle of claim 20 further comprising a display to display distance related information.

25. The vehicle of claim 24 wherein said display displays a representation of the stationary object in a position relative to a representation of said vehicle.

* * * * *